(12) United States Patent
Qin et al.

(10) Patent No.: US 12,160,537 B2
(45) Date of Patent: Dec. 3, 2024

(54) DISPLAY MODULE, METHOD FOR MANUFACTURING THE SAME, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Chaoxue Qin, Beijing (CN); Rongkun Fan, Beijing (CN); Jialin Wang, Beijing (CN); Fei Zeng, Beijing (CN); Jia Deng, Beijing (CN); Yuanhong Wen, Beijing (CN); Tianjun Deng, Beijing (CN)

(73) Assignees: BEIJING BOE TECHNOLOGY DEVELOPMENT CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 295 days.

(21) Appl. No.: 17/618,710

(22) PCT Filed: Feb. 23, 2021

(86) PCT No.: PCT/CN2021/077453
§ 371 (c)(1),
(2) Date: Dec. 13, 2021

(87) PCT Pub. No.: WO2022/178661
PCT Pub. Date: Sep. 1, 2022

(65) Prior Publication Data
US 2023/0156106 A1    May 18, 2023

(51) Int. Cl.
*B32B 3/10*    (2006.01)
*H04M 1/02*    (2006.01)

(52) U.S. Cl.
CPC ................................ *H04M 1/0269* (2022.02)

(58) Field of Classification Search
None
See application file for complete search history.

(56) References Cited

U.S. PATENT DOCUMENTS

| 10,095,059 B2 | 10/2018 | Nakase et al. |
| 2014/0346947 A1 | 11/2014 | Kim et al. |
| (Continued) | | |

FOREIGN PATENT DOCUMENTS

| CN | 104183780 A | 12/2014 |
| CN | 110085120 A | 8/2019 |
| (Continued) | | |

OTHER PUBLICATIONS

Machine translation of CN-112258988-A (Year: 2021).*

*Primary Examiner* — Christopher M Polley
(74) *Attorney, Agent, or Firm* — Lippes Mathias LLP (57) ABSTRACT

A display module includes a curved display panel and a curved cover plate that are attached by an adhesive, wherein at least one corner formed respectively by a cover plate body and a cover plate edge of the curved cover plate is a cambered corner. A thickness of a target structure at a target corner is greater than thicknesses of the target structure at other positions, the target structure being at least one of the cover plate edge and the adhesive, and a radius of curvature of the curved display panel is greater than a radius of curvature of a side, distal from the curved display panel, of the target structure.

19 Claims, 7 Drawing Sheets

(56) References Cited

U.S. PATENT DOCUMENTS

2019/0227596 A1     7/2019   Shim
2021/0337677 A1    10/2021   Lin et al.

FOREIGN PATENT DOCUMENTS

| CN | 111063262 A | | 4/2020 | |
| --- | --- | --- | --- | --- |
| CN | 111605177 A | | 9/2020 | |
| CN | 111899640 A | | 11/2020 | |
| CN | 112258988 A | * | 1/2021 | ............. G09F 9/301 |

\* cited by examiner

DISPLAY MODULE, METHOD FOR MANUFACTURING THE SAME, AND DISPLAY DEVICE

CROSS-REFERENCE TO RELATED APPLICATIONS

This application is a 371 of PCT application No. PCT/CN2021/0774153, filed on Feb. 23, 2021, the disclosure of which is herein incorporated by reference in its entirely.

TECHNICAL FIELD

The present disclosure relates to the field of display technologies, and in particular, relates to a display module, a method for manufacturing the same, and a display device.

BACKGROUND

With the advancement of display technologies, a series of curved display modules made of flexible materials emerge as the times require.

SUMMARY

The present disclosure provides a display module, a method for manufacturing the same, and a display device. Technical solutions are as follows.

According to an aspect, a display module is provided. The display module includes:
a curved display panel;
an adhesive disposed on a side of the curved display panel; and
a curved cover plate disposed on a side, distal from the curved display panel, of the adhesive, wherein the curved cover plate includes a polygonal cover plate body and a cover plate edge that encloses at least two sides of the cover plate body, wherein the cover plate edge is bent, relative to the cover plate body, in a direction approaching the adhesive, and at least one corner formed respectively by the cover plate body and the cover plate edge is a cambered corner,
wherein a thickness of a target structure at a target corner of the at least one corner is greater than thicknesses of the target structure at other positions other than the target corner, the target structure being at least one of the cover plate edge and the adhesive; and a radius of curvature of the curved display panel at the target corner is greater than a radius of curvature of a side, distal from the curved display panel, of the target structure at the target corner.

Optionally, the adhesive is an optically clear resin (OCR); and the target structure includes the adhesive.

Optionally, the target structure includes the cover plate edge.

Optionally, the cover plate body is a rectangle, the cover plate edge encloses four sides of the cover plate body, and four corners formed respectively by the cover plate body and the cover plate edge are all cambered corners.

Optionally, the rectangle is an oblong.

Optionally, each of the four corners is the target corner.

Optionally, the thicknesses of the target structure at the target corners are equal.

Optionally, the radii of curvature of the curved display panel at the target corners are equal.

Optionally, a part of the target structure at the target corner protrudes in a direction going away from the curved display panel, and
a radius of curvature of a side, proximal to the curved display panel, of the target structure is greater than a radius of curvature of a side, distal from the curved display panel, of the target structure.

Optionally, a difference between the thickness of the target structure at the target corner and thicknesses of the target structure at the other positions ranges from 3 mm to 5 mm.

Optionally, a thickness variation of the target structure at the other positions is less than a threshold.

Optionally, the curved cover plate is a flexible glass cover plate.

Optionally, an orthographic projection of the adhesive on the curved display panel is within the curved display panel.

Optionally, an orthographic projection of the curved cover plate on the curved display panel covers the curved display panel.

According to another aspect, a method for manufacturing a display module is provided. The method includes:
providing a curved display panel and a curved cover plate, wherein the curved cover plate includes a polygonal cover plate body and a cover plate edge that encloses at least two sides of the cover plate body, wherein the cover plate edge is bent, relative to the cover plate body, in a direction approaching the adhesive, and at least one corner formed respectively by the cover plate body and the cover plate edge is a cambered corner; and
attaching the curved display panel to the curved cover plate by an adhesive, wherein
a thickness of a target structure at a target corner of the at least one corner is greater than thicknesses of the target structure at other positions other than the target corner, the target structure being at least one of the cover plate edge and the adhesive; and a radius of curvature of the curved display panel at the target corner is greater than a radius of curvature of a side, distal from the curved display panel, of the target structure at the target corner.

Optionally, the adhesive is a liquid optically clear resin OCR; and the target structure includes the adhesive.

Optionally, attaching the curved display panel to the curved cover plate by the adhesive includes:
applying a liquid OCR material to a side of the curved display panel;
forming the adhesive by curing the liquid OCR material; and
covering a side, distal from the curved display panel, of the adhesive with the curved cover plate, wherein
a spraying parameter for applying the liquid OCR material at the target corner is greater than a spraying parameter for applying the liquid OCR material at other positions other than the target corner; and the spraying parameter includes a spraying density and/or a spraying speed.

Optionally, the target structure includes the cover plate edge.

According to still another aspect, a display device is provided. The display device includes: a drive circuit and the display module according to the above aspect, wherein
the drive circuit is connected to the display module and is configured to drive the display module for display.

BRIEF DESCRIPTION OF THE DRAWINGS

For clearer descriptions of the technical solutions in the embodiments of the present disclosure, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the present disclosure in detail with reference to the accompanying drawings.

Currently, a curved display module generally includes: a curved cover plate, a display panel, and an optically clear adhesive (OCA) disposed between the curved cover plate and the display panel and used for bonding them.

However, the display panel in the curved display module is extremely prone to wrinkling at a corner of the curved cover plate, resulting in a low attachment yield of the curved display module.

Figure 1:
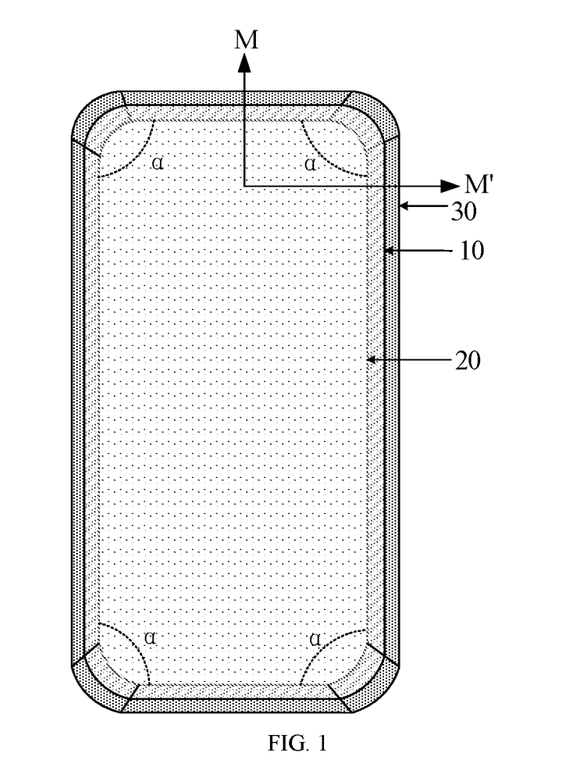
FIG. 1 is a schematic structural diagram of a display module according to an embodiment of the present disclosure.

FIG. 1 is a schematic structural diagram of a display module according to an embodiment of the present disclosure. As shown in FIG. 1, the display module may include: a curved display panel 10, an adhesive 20 disposed on a side of the curved display panel 10, and a curved cover plate 30 disposed on a side, distal from the curved display panel 10, of the adhesive 20. The curved display panel 10 and the curved cover plate 30 may be attached by the adhesive 20.

Figure 2:
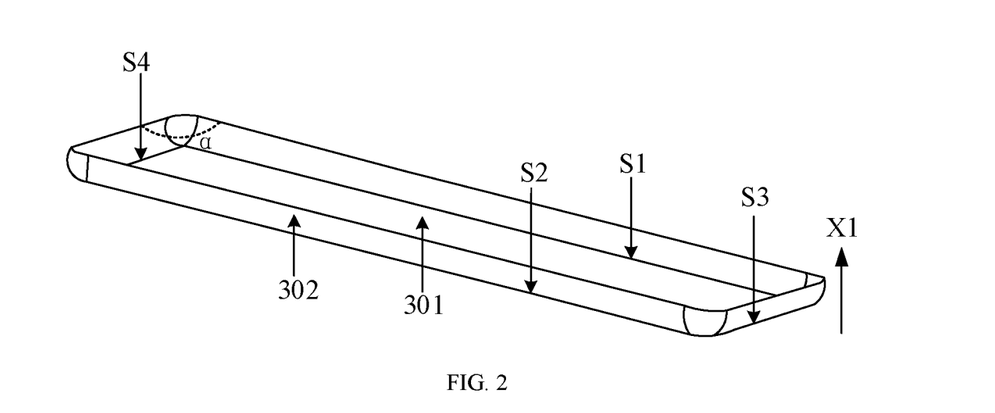
FIG. 2 is a schematic structural diagram of a curved cover plate according to an embodiment of the present disclosure.

FIG. 2 is a schematic structural diagram of a curved cover plate according to an embodiment of the present disclosure. As shown in FIG. 2, the curved cover plate 30 may include a polygonal cover plate body 301 and a cover plate edge 302 that encloses at least two sides of the cover plate body 301. The cover plate edge 302 is bent, relative to the cover plate body 301, in a direction X1 proximal to the adhesive 20; and at least one corner α formed respectively by the cover plate body 301 and the cover plate edge 302 may be a cambered corner. The cambered corner may also be referred to as a rounded corner. With reference to the figures, the rounded corner actually refers to a circular cambered corner formed by replacing an original corner with a circular arc being tangent to two sides of the corner.

For example, both the cover plate bodies 301 shown in FIG. 1 and FIG. 2 are rectangles, that is, the cover plate body 301 includes four sides. Accordingly, the cover plate edge 302 may enclose four sides S1, S2, S3, and S4 of the cover plate body 301. Four corners α may be formed respectively by the cover plate body 301 and the cover plate edge 302, and each corner α may be a cambered corner. In some embodiments, the cover plate body 301 may alternatively be of other shapes, for example, a triangle.

At least one corner α of the curved cover plate 30 is a cambered corner. Therefore, the curved display panel 10 that is attached with the curved cover plate 30 may naturally transit to a curved shape at the cambered corner, that is, a part, at the cambered corner, of the curved display panel 10 may be curved, which means that the curved display panel 10 needs to be compressed. For example, in the case that the curved display panel 10 is the rectangle shown in FIG. 1, every two adjacent sides of the curved display panel 10 need to be compressed. In response to the curved display panel 10 being compressed beyond a compression ratio that the curved display panel 10 can bear, wrinkles may be formed at a part of the curved display panel 10 at the cambered corner, or even cracks may be formed, thereby resulting in a low attachment yield and a poor display effect. The greater a degree of curvature is, the easier wrinkles are formed.

According to the display module according to this embodiment of the present disclosure, a design of non-uniform thickness described in the following embodiments is applied to a target structure in structures of the cover plate edge 301 of the curved cover plate 30 and the adhesive 20, such that a degree of curvature of the curved display panel 10 at the target corner α is greatly reduced. Accordingly, a compression degree of the curved display panel 10 is reduced, such that the compression degree is far less than the largest compression ratio that the curved display panel 10 can bear. In this way, the curved display panel 10 in the display module according to this embodiment of the present disclosure is less prone to wrinkling at the corner. The target structure refers to at least one of structures of the cover plate edge 301 and the adhesive 20. In other words, the target structure actually refers to the cover plate edge 301 and/or the adhesive 20. The target corner α refers to any one of the at least one corner α formed respectively by the cover plate body 301 and the cover plate edge 302.

Optionally, in this embodiment of the present disclosure, a thickness of the target structure in the structures of the cover plate edge 302 of the curved cover plate 30 and the adhesive 20 at the target corner α in the at least one corner α may be greater than thicknesses of the target structure at other positions other than the target corner α, that is, the cover plate edge 302 and/or the adhesive 20 in the display module may be designed to have different thicknesses at different positions, namely, non-uniform thicknesses.

In addition, on the premise that the target structure has a non-uniform thickness, a radius of curvature (also referred to as a bending radius) of the curved display panel 10 at the target corner α may be greater than a radius of curvature of a side, distal from the curved display panel 10, of the target structure at the target corner α. That is, a radian of the target structure at the target corner α is increasingly greater in a direction going away from the curved display panel 10. In other words, the non-uniform thickness design may refer to increasing a thickness of a side, proximal to the curved display panel 10, of the target structure.

Figure 3:
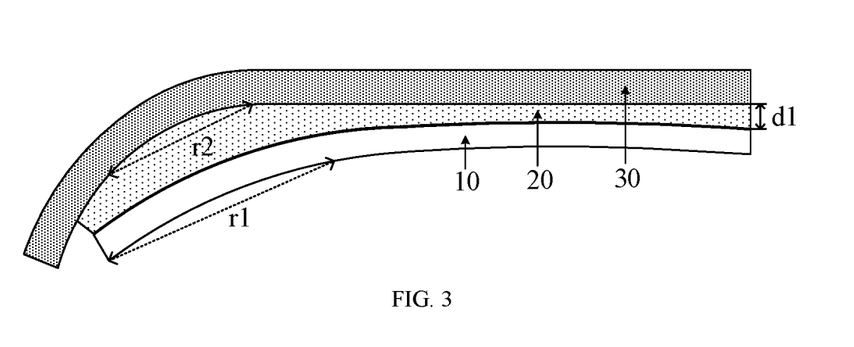
FIG. 3 is a schematic sectional view of the display module shown in FIG. 1.
Figure 4:
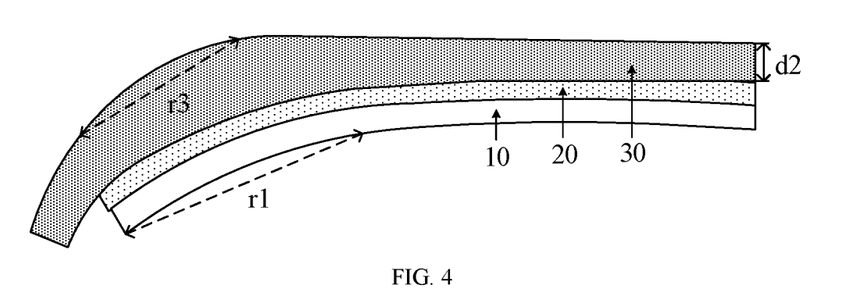
FIG. 4 is another schematic sectional view of the display module shown in FIG. 1.

For example, FIG. 3 shows a sectional view, in a direction MM', of the display module shown in FIG. 1 by using an example in which the target structure is the adhesive 20. FIG. 4 shows a sectional view, in a direction MM', of the display module shown in FIG. 1 by using an example in which the target structure is the cover plate edge 302. It can be learned with reference to FIG. 1 and FIG. 3 that a thickness d1 of the adhesive 20 at the target corner α is greater than thicknesses d1 of the adhesive 20 at other positions other than the target corner α. In addition, a radius of curvature r1 of the curved display panel 10 at the target corner α is greater than a radius of curvature r2 of a side, distal from the curved display panel 10, of the adhesive 20 at the target corner α. It can be learned with reference to FIG. 1 and FIG. 4 that a thickness d2 of the cover plate edge 302 at the target corner α is greater than thicknesses d2 of the cover plate edge 302 at other positions other than the target corner α. In addition, a radius of curvature r1 of the curved display panel 10 at the target corner α is greater than a radius of curvature r3 of a side, distal from the curved display panel 10, of the cover plate edge 302 at the target corner α.

With reference to FIG. 1 and FIG. 4, compared with the related art, the degree of curvature (namely, a radian) of the curved display panel 10 at the target corner α is obviously reduced. Accordingly, a smooth curving transition of the curved display panel 10 can be achieved at the target corner α. In this way, the curved display panel 10 is less prone to wrinkling at the target corner α, and is further less prone to cracking. In addition, a stress of the curved display panel 10 at the target corner α is reduced. The display module is endowed with a high attachment yield and a good display effect.

In addition, on the premise of a high attachment yield, a display part of the curved display panel 10 may be designed as including the target corner α, that is, the curved display panel 10 can normally display at the target corner α. In this way, a good display of the display module is ensured.

In summary, according to the display module according to this embodiment of the present disclosure, the display module includes the curved display panel and the curved cover plate that are attached by the adhesive. At least one corner formed respectively by the cover plate body and the cover plate edge of the curved cover plate is a cambered corner. The thickness of the target structure in the structures of the cover plate edge and the adhesive at the target corner is greater than thicknesses of the target structure at the other positions, and the radius of curvature of the curved display panel is greater than the radius of curvature of the side, distal from the curved display panel, of the target structure. Therefore, a smooth transition of the curved display panel can be achieved at the target corner, that is, the curved display panel is less prone to wrinkling at the target corner. The display module according to this embodiment of the present disclosure has a high attachment yield.

Optionally, the adhesive 20 described in this embodiment of the present disclosure may be a liquid optically clear resin (OCR), which may also be referred to as a liquid optically clear adhesive (LOCA).

Because the OCR is a liquid optical adhesive, a thickness of the OCR may be controlled and adjusted locally. Further, the OCR may be designed to have a non-uniform thickness described in the foregoing embodiments, so as to acquire the display module shown in FIG. 3. That is, for the display module shown in FIG. 3, the target structure described in this embodiment of the present disclosure may be the adhesive 20.

Referring to FIG. 4, the target structure described in this embodiment of the present disclosure may further include the cover plate edge 302 of the curved cover plate 30. That is, the curved cover plate 30 that has a structure shown in FIG. 4 can be directly acquired to prepare the display module.

In the case that the target structure is the cover plate edge 302, the adhesive 20 does not need to be designed to have a non-uniform thickness. In this way, a dispensing process does not need to be improved, a manufacturing process is simplified, and a manufacturing cost is reduced.

It should be noted that, in a current display module, the adhesive 20 used for attaching the curved display panel 10 and the curved cover plate 30 is a solid optically clear adhesive (OCA) whose thickness cannot be controlled locally. In addition, the cover plate edge 302 of the current curved cover plate 30 is designed to have a uniform thickness, that is, a thickness of the cover plate edge 302 at the corner is the same as thicknesses of the cover plate edge 302 at other positions. In this way, the curved display panel 10 in the current display module inevitably wrinkles at the corner, resulting in a low attachment yield. With reference to the foregoing descriptions, in this embodiment of the present disclosure, the OCA may be replaced with the OCR, and the OCR may be designed to have a non-uniform thickness such a degree of curvature of the curved display panel 10 at the corner is reduced; and/or, the curved cover plate 30 with the cover plate edge 301 that has a non-uniform thickness may be used to reduce the degree of curvature of the curved display panel 10 at the corner.

Optionally, the cover plate edge 301 of the curved cover plate 30 described in this embodiment of the present disclosure is bendable. Therefore, the curved cover plate 30 may be a flexible glass cover plate. Accordingly, the curved cover plate 30 may also be referred to as cover glass (CG).

Optionally, with reference to FIG. 2, the cover plate body 301 described in this embodiment of the present disclosure may be a rectangle. The cover plate edge 302 encloses four sides of the cover plate body 301. Four corners α formed respectively by the cover plate body 301 and the cover plate edge 302 are all cambered corners. For example, the rectangle may be an oblong with long edges and short edges shown in FIG. 2. The long edges are relatively longer than the short edges. In other words, the short edges are relatively shorter than the long edges.

Optionally, with reference to FIG. 2 again, the target corner may be any one of the four corners α of the display module that is a rectangle described in this embodiment of the present disclosure. That is, a thickness of the target structure at each corner may be greater than thicknesses of the target structure at the other positions.

Figure 5:
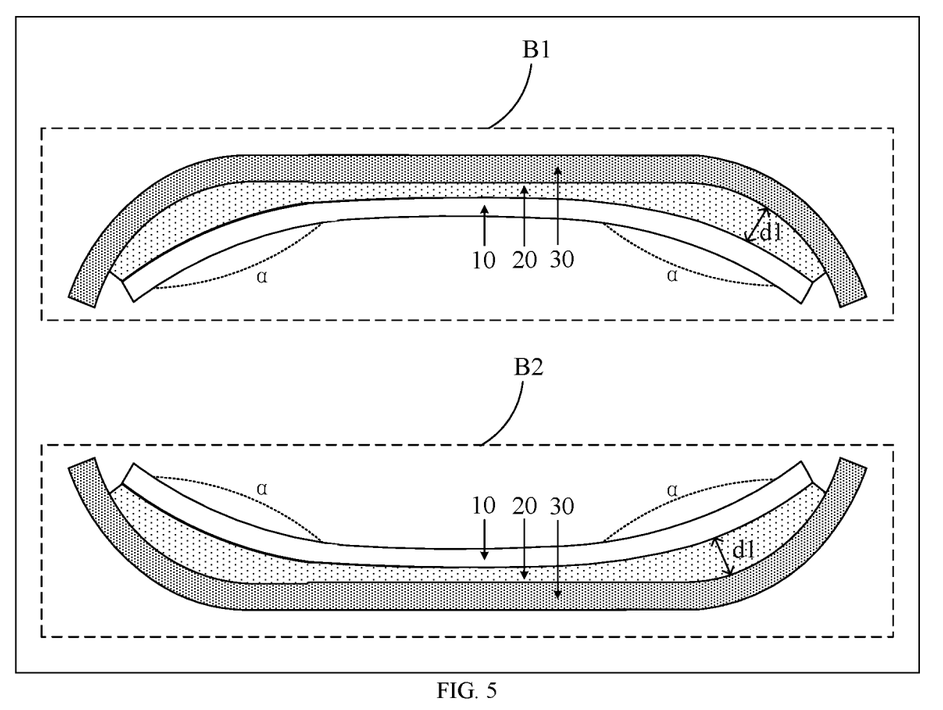
FIG. 5 is a schematic structural diagram of a display module whose target structure is an adhesive according to an embodiment of the present disclosure.
Figure 6:
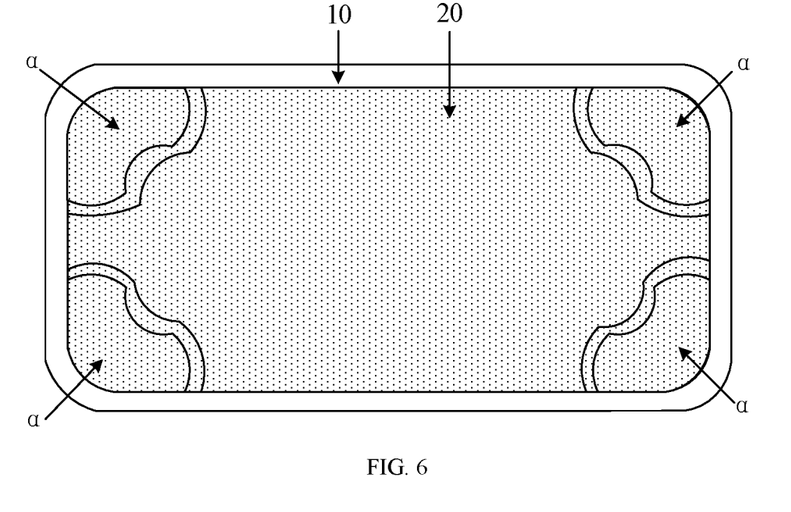
FIG. 6 is a schematic structural diagram of another display module whose target structure is an adhesive according to an embodiment of the present disclosure.

For example, FIG. 5 is a schematic diagram of a display module by using an example in which the target structure is the adhesive 20 and the display module is a rectangle. FIG. 6 is a top view of a display module by using FIG. 5 as an example. It can be learned with reference to FIG. 5 and FIG. 6 that a thickness d1 of the adhesive 20 at each corner α is greater than thicknesses d1 of the adhesive 20 at other positions. In addition, FIG. 5 only shows an upper edge part B1 and a lower edge part B2 of the display module. FIG. 6 only shows the curved display panel 10 and the adhesive 20.

Figure 7:
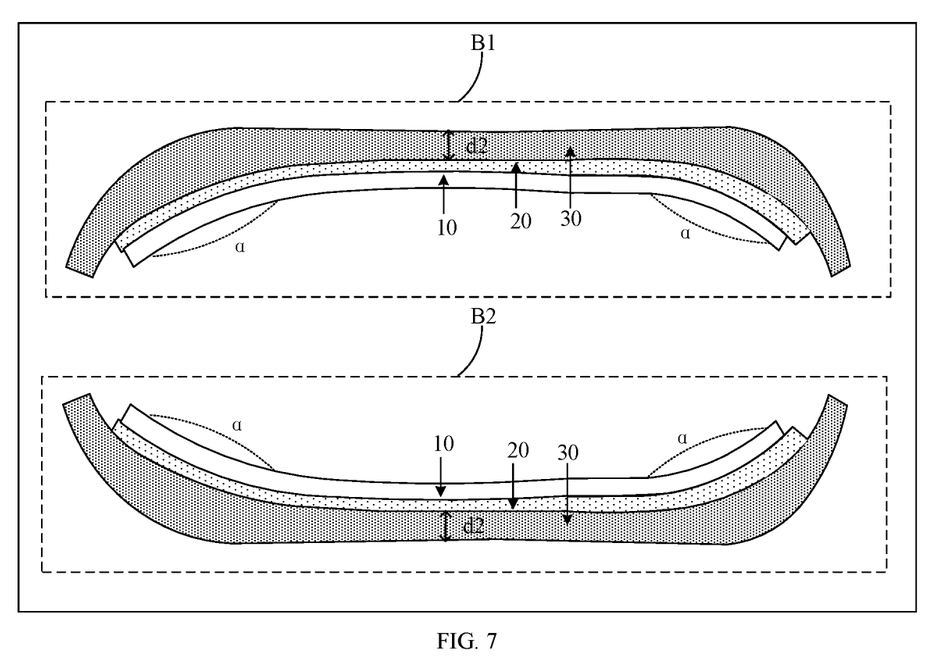
FIG. 7 is a schematic structural diagram of a display module whose target structure is a curved cover plate according to an embodiment of the present disclosure.
Figure 8:
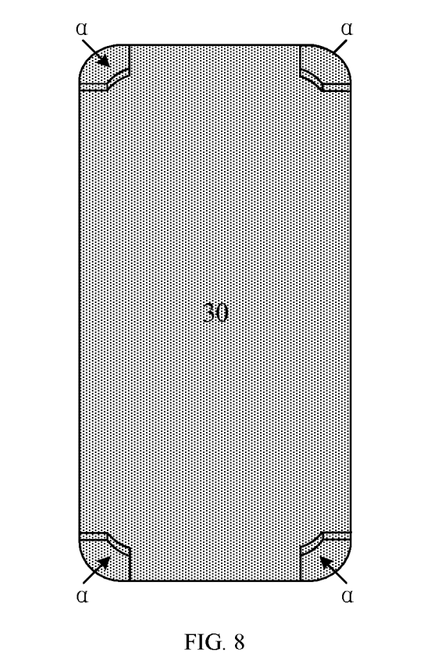
FIG. 8 is a schematic structural diagram of another display module whose target structure is a curved cover plate according to an embodiment of the present disclosure.

For example, FIG. 7 is a schematic diagram of a display module by using an example in which the target structure is the cover plate edge 301 and the display module is a rectangle. FIG. 8 is a top view of a display module by using FIG. 7 as an example. It can be learned with reference to FIG. 7 and FIG. 8 that a thickness d2 of the cover plate edge 301 at each corner α is greater than thicknesses d2 of the cover plate edge 301 at other positions. In addition, FIG. 7 only shows an upper edge part B1 and a lower edge part B2 of the display module. FIG. 8 only shows the curved cover plate 30.

By setting a thickness of the target structure at each corner to be greater than thicknesses of the target structure at other positions, degree of curvatures of the curved display panel 10 at corners are relatively small. In this way, the curved display panel 10 is less prone to wrinkling at corners. In the case that the display module is a rectangle, a display part of the display module may include the four corners, such that the display module is endowed with an amazing and rich display effect.

Optionally, in this embodiment of the present disclosure, thicknesses of the target structure at the target corners α may be equal. For example, with reference to FIG. 5 to FIG. 8, thicknesses of the target structure at the four corners α are equal.

In this way, it can be ensured that degrees of curvature of the curved display panel 10 at the corners α are consistent, further increasing an attachment yield and improving a display effect.

Optionally, with reference to FIG. 1 and FIG. 5 to FIG. 8, in the display module according to this embodiment of the present disclosure, radii of curvature r1 of the curved display panel 10 at the target corners α may be equal. In this way, it can be further ensured that the degree of curvatures of the curved display panel 10 at the corners α are consistent.

Figure 9:
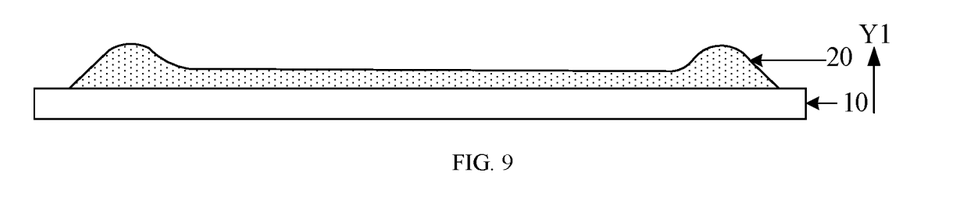
FIG. 9 is a schematic structural diagram of still another display module whose target structure is an adhesive according to an embodiment of the present disclosure.

For example, by setting thicknesses of the target structure at the target corners α to be equal, radii of curvature r1 of the curved display panel 10 at the target corners α are made equal Optionally, with reference to the foregoing accompanying drawings and FIG. 9, in this embodiment of the present disclosure, a part of the target structure at the target corner α may protrude in a direction Y1 distal from the curved display panel 10.

Figure 10:
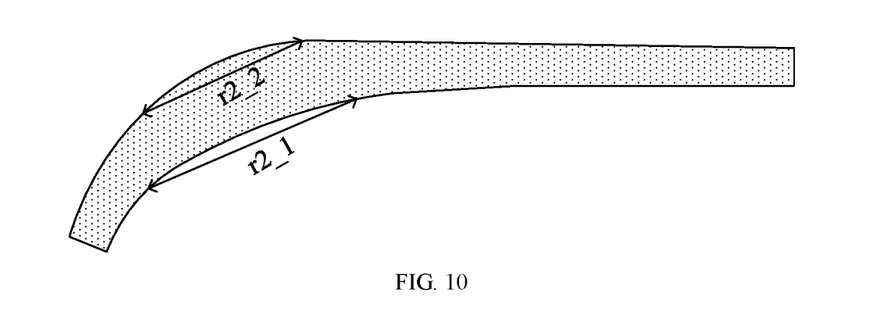
FIG. 10 is a schematic diagram of an optional structure of an adhesive according to an embodiment of the present disclosure.

In addition, with reference to FIG. 9 and FIG. 10, a radius of curvature r2_1 of a side, proximal to the curved display panel 10, of the target structure may be greater than a radius of curvature r2_2 of a side, distal from the curved display panel 10, of the target structure. That is, radians of the target structure at the target corner α are increasingly great in a direction going away from the curved display panel 10. In this way, it can be effectively ensured that a radius of curvature of the curved display panel 10 at the target corner α is relatively great, and a degree of curvature of the curved display panel 10 at the target corner α is relatively small.

Optionally, in this embodiment of the present disclosure, a thickness variation of the target structure at other positions other than the target corner α may be less than a threshold. That is, with reference to FIG. 9, thicknesses of parts of the target structure at the other positions may be consistent as far as possible. In this way, an attachment yield is further increased, and a better display effect is achieved.

It should be noted that both the target structures shown in FIG. 9 and FIG. 10 are the adhesive 20.

Optionally, in this embodiment of the present disclosure, a difference between the thickness of the target structure at the target corner α and thicknesses of the target structure at the other positions may range from 3 mm to 5 mm. For example, in the case that the thicknesses of the target structure at the other positions are 3 mm, the thickness of the target structure at the target corner α may be approximately 6 mm to 8 mm.

It should be noted that the thickness difference is merely an example for description, and may vary depending on different display modules.

Optionally, with reference to the display module shown in FIG. 1, in this embodiment of the present disclosure, an orthographic projection of the adhesive 20 on the curved display panel 10 may be within the curved display panel 10. In addition, an orthographic projection of the curved cover plate 30 on the curved display panel 10 may cover the curved display panel 10. That is, a relationship of area sizes of the curved display panel 10, the adhesive 20, and the curved cover plate 30 may be as follows: the area size of the curved cover plate 30 is greater than the area size of the curved display panel 10, and the area size of the curved display panel 10 is greater than the area size of the adhesive 20.

In summary, this embodiment of the present disclosure provides a display module. The display module includes the curved display panel and the curved cover plate that are attached by the adhesive. At least one corner formed respectively by the cover plate body and the cover plate edge of the curved cover plate is a cambered corner. The thickness of the target structure in the structures of the cover plate edge and the adhesive at the target corner is greater than thicknesses of the target structure at the other positions, and the radius of curvature of the curved display panel is greater than the radius of curvature of a side, distal from the curved display panel, of the target structure. Therefore, a smooth transition, at the target corner, of the curved display panel can be achieved, which means that the curved display panel is less prone to wrinkling at the target corner. The display module according to this embodiment of the present disclosure has a high attachment yield.

Figure 11:
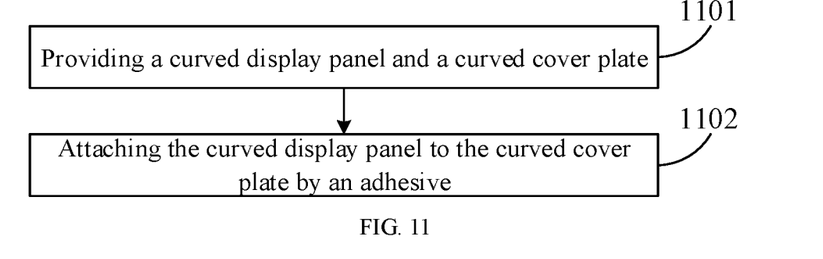
FIG. 11 is a flowchart of a method for manufacturing a display module according to an embodiment of the present disclosure.

FIG. 11 is a flowchart of a method for manufacturing a display module according to an embodiment of the present disclosure, wherein the method may be used to manufacture the display module described in the foregoing embodiments. As shown in FIG. 11, the method may include the following processes.

In process 1101, a curved display panel and a curved cover plate are provided.

Referring to FIG. 2, the curved cover plate 30 according to this embodiment of the present disclosure may include a polygonal cover plate body 301 and a cover plate edge 302 that encloses at least two sides of the cover plate body 302. The cover plate edge 302 is bent, relative to the cover plate body 301, in a direction approaching an adhesive 20, and at least one corner α formed respectively by the cover plate body 301 and the cover plate edge 302 may be a cambered corner.

In process 1102, the curved display panel and the curved cover plate are attached by the adhesive.

Referring to the structure shown in any one of FIG. 3 to FIG. 8, a thickness of a target structure at a target corner in the at least one corner α is greater than thicknesses of the target structure at other positions other than the target corner α, the target structure being at least one of the cover plate edge 302 and the adhesive 20 in the display module, and a radius of curvature of the curved display panel 10 at the target corner is greater than a radius of curvature of a side, distal from the curved display panel 10, of the target structure at the target corner.

In summary, according to the method for manufacturing a display module according to this embodiment of the present disclosure, the thickness of the target structure at the target corner is greater than thicknesses of the target structure at the other positions, the target structure being at least one of the cover plate edge and the adhesive in the display module manufactured using the method, and the radius of curvature of the curved display panel at the target corner is relatively great. In this way, a smooth transition of the curved display panel at the target corner can be achieved. Therefore, the curved display module is less prone to wrinkling at the target corner, and the display module is endowed with a higher attachment yield.

Optionally, the adhesive described in this embodiment of the present disclosure may be a liquid OCR. Accordingly, in an optional implementation, with reference to FIG. 3, FIG. 5, FIG. 6, FIG. 9, and FIG. 10, the target structure may be the adhesive. In this way, with reference to the flowchart of the method shown in FIG. 12, process 1102 may include the following processes.

Figure 12:
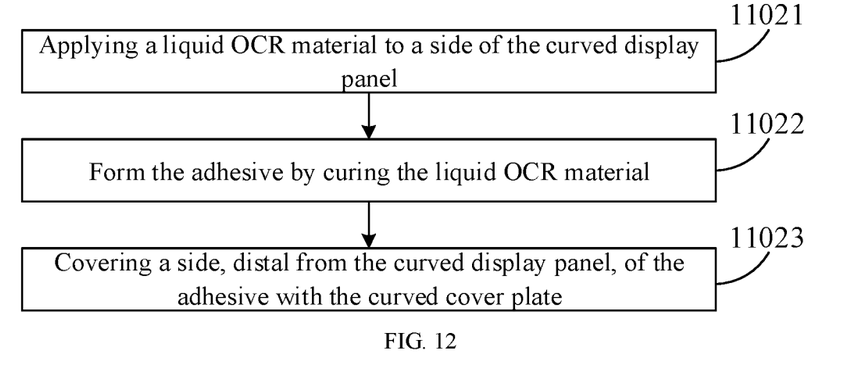
FIG. 12 is a flowchart of a method for attaching a curved cover plate to a curved display panel by an adhesive according to an embodiment of the present disclosure.

In process 11021, a side of the curved display panel is applied with a liquid OCR material.

Figure 13:
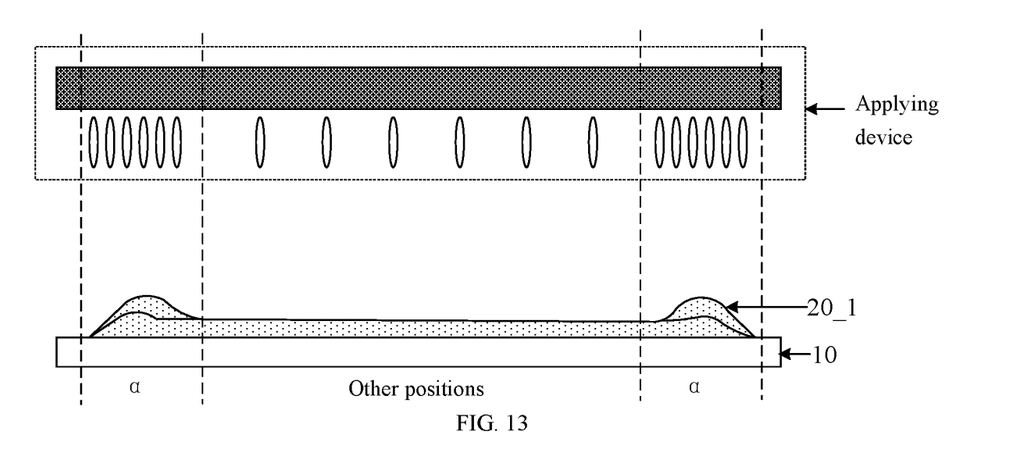
FIG. 13 is a schematic diagram of an applying process according to an embodiment of the present disclosure.

For example, with reference to a structural diagram of a process shown in FIG. 13, in this embodiment of the present disclosure, an applying device (for example, a dispenser) may be used to apply a liquid OCR material 20_1 to a side of the curved display panel 10. In addition, to enable a thickness of the adhesive 20 at the target corner α to be greater than thicknesses of the adhesive 20 at other positions, referring to FIG. 13, a spraying parameter for applying the liquid OCR material at the target corner α using the applying device is greater than a spraying parameter for applying the liquid OCR material at other positions other than the target corner α using the coating device.

Optionally, the spraying parameter may include a spraying density and/or a spraying speed. The spraying density may refer to an amount of the applied liquid OCR material, and the spraying speed may refer to an applying speed of the liquid OCR material. That is, thicknesses of the adhesive 20 at different positions can be controlled by varying a spraying parameter of the applying device in this embodiment of the present disclosure.

For example, it can be learned from FIG. 13 that, an amount of the liquid OCR material 20_1 applied using the applying device on a side of the curved display panel 10 at the target corner α is relatively great, whereas an amount of the liquid OCR material 20_1 applied using the applying device on the side of the curved display panel 10 at other positions is relatively small. That is, a density of the liquid OCR material applied using the applying device at the target corner α is greater than a density of the liquid OCR material applied at other positions.

The spraying parameter is not limited in this embodiment of the present disclosure. Any adjustable parameter that can enable a thickness of the adhesive 20 at the target corner α to be greater than thicknesses of the adhesive 20 at other positions may be used as the spraying parameter.

It should be noted that a non-uniform thickness design can be achieved by changing a spraying parameter of the applying device. Therefore, the applying device can be used to complete the applying by the one-time applying process (also referred to as spraying), which is more efficient.

In process 11022, the adhesive is formed by curing the liquid OCR material.

Figure 14:
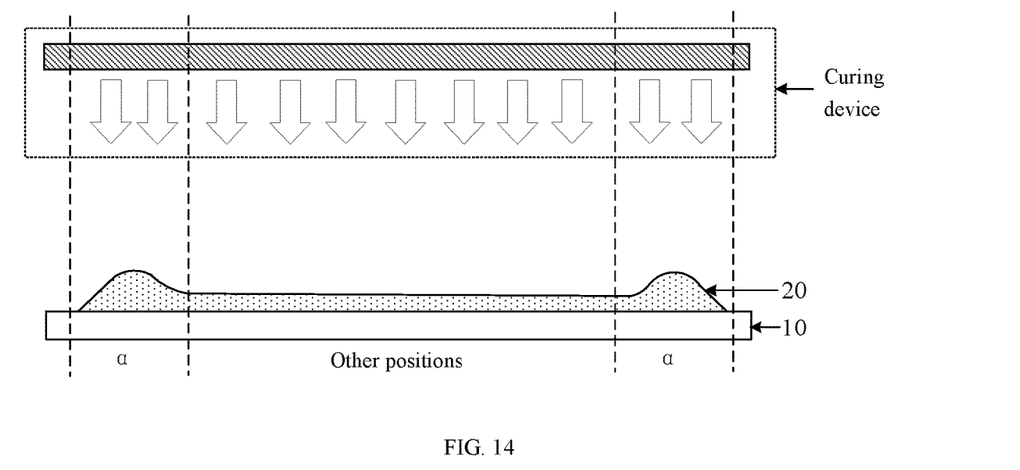
FIG. 14 is a schematic diagram of a curing process according to an embodiment of the present disclosure.

For example, referring to a structural diagram of a process shown in FIG. 14, upon completion of the applying of the liquid OCR material, a curing device, for example, an ultraviolet lamp (UV lamp) may be used to cure the liquid OCR material applied on a side of the curved display panel, so as to form the adhesive 20 that is in a semi-flow state. This process may also be referred to as pre-hardening of the liquid OCR material.

In process 11023, a side, distal from the curved display panel, of the adhesive is covered with the curved cover plate.

Figure 15:
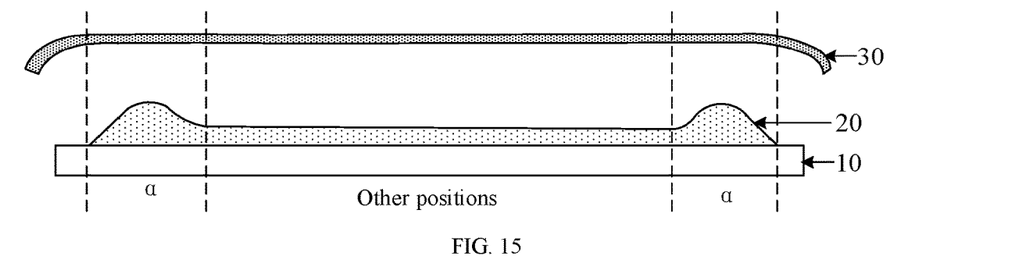
FIG. 15 is a schematic diagram of an attaching process according to an embodiment of the present disclosure.
Figure 16:
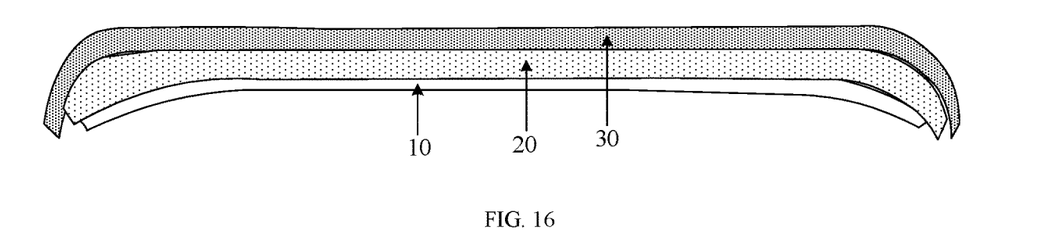
FIG. 16 is a schematic structural diagram of yet another display module according to an embodiment of the present disclosure.

For example, referring to a structural diagram of a process shown in FIG. 15, upon formation of the adhesive 20, the acquired curved cover plate 30 can be disposed to cover the adhesive 20, so as to acquire the display module having the structure shown in FIG. 16.

In another optional implementation, referring to FIG. 4, FIG. 7, and FIG. 8, the target structure described in this embodiment of the present disclosure may include the cover plate edge 301 of the curved cover plate 30.

Optionally, the curved cover plate shown in FIG. 4, FIG. 7, and FIG. 8 may be formed through the following process. A layer of material (for example, flexible glass) is firstly welded on a part, at the target corner, of the cover plate edge 301 upon cutting, so as to increase a thickness of the cover plate edge 301 at the target corner; and then a series of operations such as outside shape processing, cleaning, and inspection, as well as hot pressing are performed.

In summary, according to the method for manufacturing a display module according to this embodiment of the present disclosure, the thickness of the target structure at the target corner is greater than thicknesses of the target structure at the other positions, the target structure being at least one of the cover plate edge and the adhesive in the display module manufactured using the method, and the radius of curvature of the curved display panel at the target corner is relatively great. In this way, a smooth transition of the curved display panel can be achieved at the target corner. Further, the curved display panel is less prone to wrinkling at the target corner. Therefore, the display module is endowed with a higher attachment yield.

Figure 17:
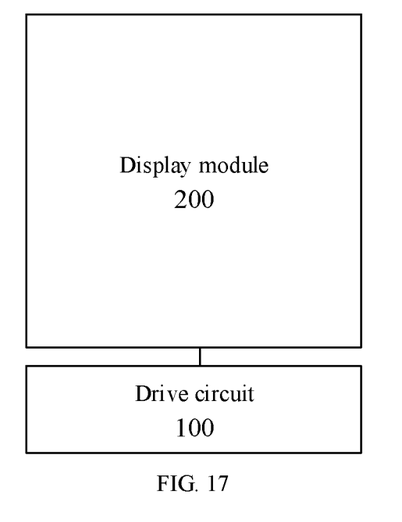
FIG. 17 is a schematic structural diagram of a display device according to an embodiment of the present disclosure.

FIG. 17 is a schematic structural diagram of a display device according to an embodiment of the present disclosure. As shown in FIG. 17, the display device may include a drive circuit 100 and the display module 200 described in the foregoing embodiments. The drive circuit 100 may be connected to the display module 200 and configured to drive the display module 200 for display.

Optionally, the display device may be an organic light-emitting diode (OLED) display device, a liquid crystal display device, an active-matrix organic light-emitting diode (AMOLED) display device, a mobile phone, a tablet computer, a flexible display device, a television, a display, and any other products or components with a display function.

In the embodiments of the present disclosure, the term "and/or" is merely used to indicate association relationships of associated objects, and represent that there may be three relationships. For example, A and/or B may include three cases: only A exists, both A and B exist, and only B exists.

Described above are merely optional embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A display module, comprising:
a curved display panel;
an adhesive disposed on a side of the curved display panel; and
a curved cover plate disposed on a side, distal from the curved display panel, of the adhesive, wherein the curved cover plate comprises a polygonal cover plate body and a cover plate edge that encloses at least two sides of the cover plate body, wherein the cover plate edge is bent, relative to the cover plate body, in a direction approaching the adhesive, and at least one corner formed respectively by the cover plate body and the cover plate edge is a cambered corner;
wherein a thickness of a target structure at a target corner of the at least one corner is greater than thicknesses of the target structure at other positions other than the target corner, the target structure being at least one of the cover plate edge and the adhesive; and a radius of curvature of the curved display panel at the target corner is greater than a radius of curvature of a side, distal from the curved display panel, of the target structure at the target corner;
a part of the target structure at the target corner protrudes in a direction going away from the curved display panel; and
a radius of curvature of a side, proximal to the curved display panel, of the target structure is greater than a radius of curvature of a side, distal from the curved display panel, of the target structure.

2. The display module according to claim 1, wherein the adhesive is a liquid optically clear resin OCR; and the target structure comprises the adhesive.

3. The display module according to claim 1, wherein the target structure comprises the cover plate edge.

4. The display module according to claim 1, wherein the cover plate body is a rectangle, the cover plate edge encloses four sides of the cover plate body, and four corners formed respectively by the cover plate body and the cover plate edge are all cambered corners.

5. The display module according to claim 4, wherein the rectangle is an oblong.

6. The display module according to claim 4, wherein each of the four corners is the target corner.

7. The display module according to claim 6, wherein the thicknesses of the target structure at all the target corners are equal.

8. The display module according to claim 6, wherein the curvature radii of the curved display panel at the target corners are equal.

9. The display module according to claim 1, wherein a difference between the thickness of the target structure at the target corner and the thicknesses of the target structure at the other positions ranges from 3 mm to 5 mm.

10. The display module according to claim 1, wherein a thickness variation of the target structure at the other positions is less than a threshold.

11. The display module according to claim 1, wherein the curved cover plate is a flexible glass cover plate.

12. The display module according to claim 1, wherein an orthographic projection of the adhesive on the curved display panel is within the curved display panel.

13. The display module according to claim 1, wherein an orthographic projection of the curved cover plate on the curved display panel covers the curved display panel.

14. The display module according to claim 8, wherein the target structure comprises the cover plate edge; the rectangle is an oblong; and
a difference between the thickness of the target structure at the target corner and thicknesses of the target structure at the other positions ranges from 3 mm to 5 mm; a thickness variation of the target structure at the other positions is less than a threshold; the curved cover plate is a flexible glass cover plate; an orthographic projection of the adhesive on the curved display panel is within the curved display panel; and an orthographic projection of the curved cover plate on the curved display panel covers the curved display panel.

15. A method for manufacturing a display module, comprising:
providing a curved display panel and a curved cover plate, wherein the curved cover plate comprises a polygonal cover plate body and a cover plate edge that encloses at least two sides of the cover plate body, wherein the cover plate edge is bent, relative to the cover plate body, in a direction approaching the adhesive, and at least one corner formed respectively by the cover plate body and the cover plate edge is a cambered corner; and
attaching the curved display panel to the curved cover plate by an adhesive, wherein
a thickness of a target structure at a target corner of the at least one corner is greater than thicknesses of the target structure at other positions other than the target corner, the target structure being at least one of the cover plate edge and the adhesive; and a radius of curvature of the curved display panel at the target corner is greater than a radius of curvature of a side, distal from the curved display panel, of the target structure at the target corner;
a part of the target structure at the target corner protrudes in a direction going away from the curved display panel; and
a radius of curvature of a side, proximal to the curved display panel, of the target structure is greater than a radius of curvature of a side, distal from the curved display panel, of the target structure.

16. The method according to claim 15, wherein the adhesive is an optically clear resin OCR; and the target structure comprises the adhesive.

17. The method according to claim 16, wherein attaching the curved display panel to the curved cover plate by the adhesive comprises:
applying a liquid OCR material to a side of the curved display panel;
forming the adhesive by curing the liquid OCR material; and
covering a side, distal from the curved display panel, of the adhesive with the curved cover plate, wherein
a spraying parameter for applying the liquid OCR material at the target corner is greater than a spraying parameter for applying the liquid OCR material at other positions other than the target corner; and the spraying parameter comprises a spraying density and/or a spraying speed.

18. The method according to claim 15, wherein the target structure comprises the cover plate edge.

19. A display device, wherein the display device comprises: a drive circuit and a display module, wherein
the drive circuit is connected to the display module and is configured to drive the display module for display; wherein
the display module comprises:
a curved display panel;
an adhesive disposed on a side of the curved display panel; and
a curved cover plate disposed on a side, distal from the curved display panel, of the adhesive, wherein the curved cover plate comprises a polygonal cover plate body and a cover plate edge that encloses at least two sides of the cover plate body, wherein the cover plate edge is bent, relative to the cover plate body, in a direction approaching the adhesive, and at least one corner formed respectively by the cover plate body and the cover plate edge is a cambered corner;
wherein a thickness of a target structure at a target corner of the at least one corner is greater than thicknesses of the target structure at other positions other than the target corner, the target structure being at least one of the cover plate edge and the adhesive; and a radius of curvature of the curved display panel at the target corner is greater than a radius of curvature of a side, distal from the curved display panel, of the target structure at the target corner;
a part of the target structure at the target corner protrudes in a direction going away from the curved display panel; and
a radius of curvature of a side, proximal to the curved display panel, of the target structure is greater than a radius of curvature of a side, distal from the curved display panel, of the target structure.

* * * * *